United States Patent
Davidson et al.

(10) Patent No.: US 11,426,956 B2
(45) Date of Patent: *Aug. 30, 2022

(54) METHOD FOR COMPOSITE FLOW MOLDING

(71) Applicant: Arris Composites Inc., Berkeley, CA (US)

(72) Inventors: Erick Davidson, Piedmont, CA (US); Ethan Escowitz, Berkeley, CA (US); Sean Hennessee, San Francisco, CA (US); Riley Reese, Oakland, CA (US)

(73) Assignee: Arris Composites Inc., Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/176,465

(22) Filed: Feb. 16, 2021

(65) Prior Publication Data

US 2021/0162684 A1 Jun. 3, 2021

Related U.S. Application Data

(63) Continuation of application No. 16/597,647, filed on Oct. 9, 2019, now Pat. No. 10,946,595.

(Continued)

(51) Int. Cl.
*B29C 70/48* (2006.01)
*B29C 70/54* (2006.01)
(Continued)

(52) U.S. Cl.
CPC .............. *B29C 70/48* (2013.01); *B29C 43/34* (2013.01); *B29C 43/361* (2013.01); *B29C 43/58* (2013.01);
(Continued)

(58) Field of Classification Search
CPC ................ B29C 70/42; B29K 2307/04; B29K 2101/12; B29L 2031/7162
See application file for complete search history.

(56) References Cited

U.S. PATENT DOCUMENTS 5,435,953 A * 7/1995 Osada ................... B29C 45/462
264/102
5,753,164 A 5/1998 Ritchie et al.
(Continued)

FOREIGN PATENT DOCUMENTS

EP        0177736 A2    4/1986
GB        2280144 A     1/1995
JP        2011-131421 A 7/2011

OTHER PUBLICATIONS

Advisory Action (PTOL-303) dated Nov. 30, 2020 for U.S. Appl. No. 16/597,676.

(Continued)

*Primary Examiner* — Monica A Huson
(74) *Attorney, Agent, or Firm* — Kaplan Breyer Schwarz, LLP

(57) ABSTRACT

An apparatus for molding a part includes a plunger cavity, a plunger, and a mold cavity, wherein the plunger is oriented out-of-plane with respect to a major surface of the mold cavity, and first and second vents couples to respective first and second portions of the mold cavity. In a method, resin and fiber are forced into the mold cavity from a plunger cavity, and at least some of the fibers and resin are preferentially flowed to certain region in the mold cavity via the use of vents.

8 Claims, 10 Drawing Sheets

Related U.S. Application Data

(60) Provisional application No. 62/743,390, filed on Oct. 9, 2018.

(51) Int. Cl.
    *B29C 70/34* (2006.01)
    *B29C 43/34* (2006.01)
    *B29C 43/36* (2006.01)
    *B29C 43/58* (2006.01)
    *B29K 307/04* (2006.01)

(52) U.S. Cl.
    CPC ............ *B29C 70/345* (2013.01); *B29C 70/54* (2013.01); *B29C 2043/3444* (2013.01); *B29C 2043/3615* (2013.01); *B29C 2043/5808* (2013.01); *B29K 2307/04* (2013.01)

(56) References Cited

U.S. PATENT DOCUMENTS

| | | | |
|---|---|---|---|
| 6,106,274 | A | 8/2000 | Ritchie et al. |
| 7,503,093 | B2 | 3/2009 | Weihrauch |
| 10,946,595 | B2 * | 3/2021 | Davidson ................ B29C 45/53 |
| 2003/0047825 | A1 | 3/2003 | Visconti et al. |
| 2004/0041294 | A1 | 3/2004 | Horiuchi et al. |

OTHER PUBLICATIONS

Advisory Action (PTOL-303) dated Oct. 21, 2020 for U.S. Appl. No. 16/597,647.
Authorized Officer Tomasz Horubala, International Search Report dated Jan. 29, 2020 issued in PCT Patent Application No. PCT/US2019/0554458.
Examiner initiated interview summary (PTOL-413B) dated Oct. 21, 2020 for U.S. Appl. No. 16/597,647.
Final Rejection dated Jun. 26, 2020 for U.S. Appl. No. 16/597,647.
Final Rejection dated Oct. 1, 2020 for U.S. Appl. No. 16/597,676.
Non-Final Office Action received for U.S. Appl. No. 16/597,676, dated Apr. 16, 2020, 6 pages.
Non-Final Rejection dated Dec. 12, 2019 for U.S. Appl. No. 16/597,647.
Notice of Allowance and Fees Due (PTOL-85) dated Dec. 8, 2020 for U.S. Appl. No. 16/597,647.
Requirement for Restriction/Election received for U.S. Appl. No. 16/597,676, dated Nov. 29, 2019.
Office Action issued in European patent application No. 19794828.4, dated May 19, 2021, 3 pp.

\* cited by examiner

METHOD FOR COMPOSITE FLOW MOLDING

STATEMENT OF RELATED CASES

This case claims priority of U.S. Pat. App. Ser. No. 62/743,390 filed Oct. 9, 2018, which is incorporated by reference herein.

FIELD OF THE INVENTION

This disclosure relates generally to molding complex parts, particularly those with very small, thin, or intricate features.

BACKGROUND

It is often desirable to fabricate parts from fiber-composite materials. A fiber composite part includes fibers that are dispersed within a matrix, formed from a resin. The matrix surrounds and supports the fibers by maintaining their relative positions, in addition to preventing the fibers from abrasion and environmental attack. The fibers impart their mechanical and physical properties to enhance those of the matrix. The combination is synergistic; the composite possesses material properties unavailable from the individual constituents, such as a very high strength-to-weight ratio.

A variety of different molding processes are available to form fiber-composite parts, such as compression molding, filament winding, pultrusion, wet layup, and transfer molding. There are, however, challenges to using such processes for fabricating complex parts with very small, thin, or intricate features, particularly those requiring substantial strength and stiffness.

SUMMARY

The present invention provides a method for fabricating fiber-reinforced parts having very small, thin, or intricate features, as well as desired properties. Such parts might have feature sizes that are too small/thin to accommodate bent preforms, yet, at the same time, require continuous fibers for strength and stiffness.

In accordance with the present teachings, preforms are placed on a portion of a mold cavity. A preform is a sized, or sized and shaped bundle of fiber. In the illustrative embodiment, the bundle of fiber contains thousands of fibers, and is typically referred to as "tow." In the illustrative embodiment, the fibers in the tow are (pre-) impregnated with a polymer resin; the tow is then called "towpreg" or "prepreg tow."

The preforms are compressed and heated, which melts the resin therein. In the illustrative embodiment, the compression is applied by a plunger that moves linearly within a plunger cavity, wherein the stroke axis (direction) of the plunger is oriented at least 45 degrees out-of-plane with respect to a major surface of the mold cavity. In the illustrative embodiments, the major surface of the mold cavity is substantially orthogonal to the plunger's stroke axis.

Embodiments of the invention enable a level of control of fiber movement/placement that is not possible with prior-art molding processes that utilize a plunger. In the prior art, particularly with injection-molding processes, chopped fiber is used as feedstock. As the chopped fiber is forced into a mold via a plunger, it rotates and turns based on the movement of resin through the mold cavity, as well as collisions with a complex and random matrix of other fibers. In embodiments of the invention, however, the feed comprises a majority of relatively long fibers (i.e., fibers that are comparable to the length of a major axis of the part being formed). It is believed that the use of long fibers stabilizes the underlying fiber structure of the part because the fibers are kept under some degree of tension due to features of the process, such that the fibers do not strictly follow the flow of the liquid resin. Rather, fiber position and orientation in the mold cavity and, hence, the final part, are controlled, to a substantial degree, by characteristics of the fiber (e.g., length, orientation in the plunger cavity, etc.), rather than the liquefied resin.

In embodiments of the method, the preforms are oriented such that:
  they align with the stroke direction of the plunger; or
  they align with a plane that is orthogonal to the stroke direction of the plunger; or
  some align with, and some are within a plane that is orthogonal to, the stroke direction of the plunger;
  they align with one or more planes that are parallel to a major surface of the mold cavity; or
  they neither align with, nor align with a plane that is orthogonal to, the stroke direction of the plunger.

For preforms that align with one or more planes that are parallel to a major surface of the mold cavity, in some embodiments of the method:
  they are aligned with the long(est) axis of the mold cavity (i.e., the "axial" direction); or
  they are transverse (in-plane and orthogonal) to the long (est) axis of the mold cavity (i.e., the "transverse" direction); or
  some align with the axial direction and some align with the transverse direction; or
  they are oriented at a non-zero angle with respect to the axial direction and transverse direction; or
  they are segregated into at least two groups that are oriented at different non-zero angles with respect to the axial direction and transverse direction.

In various embodiments, the preforms include:
  continuous fiber (i.e., fiber as long as the longest axis of the mold cavity); or
  shorter fiber (i.e., fiber having a length similar to that of smaller features of the mold cavity); or
  mixtures of both continuous and shorter fibers.

Fibers tend, to some degree, to align with the direction of flow through the mold cavity. Also, fibers flow to areas of relatively lower pressure. Consequently, the inventors realized that fibers, when appropriately sized, can be directed into very thin, small, or otherwise intricate features, or their final orientation in the part can be engineered. Key parameters in that regard is the size of the fiber (i.e., comparable to the size of the small feature) as well as the selective placement and actuation of vents, which can alter the flow of resin and fiber through the mold cavity.

In accordance with some embodiments, the final location of fibers in a mold cavity during plunger-driven compression molding, and, hence, their final location in the part being fabricated, can be controlled through the use of one or more of the following parameters, as a function of application specifics:
  (a) fiber length;
  (b) the orientation of fibers in the plunger cavity;
  (c) the order in which fibers (preforms) are stacked in the plunger cavity;
  (d) the incorporation of vents, and their specific placement in the mold cavity;
  (e) the sequencing of vent actuation.

The feedstock (i.e., preforms) is placed in the plunger cavity. In some embodiments, the preforms are stacked in successive layers in the plunger cavity. After the resin has melted (due to applied heat/energy), advancing the plunger through the plunger cavity forces fiber and melted resin into the mold cavity. In some embodiments, vents are opened and closed multiple times during a single plunger stroke. The use of the vents enables pressure to be selectively reduced in desired regions of a mold cavity, which will facilitate directing the flow of resin and fiber to such reduced-pressure regions.

In accordance with some embodiments of the method, sequencing the actuation of the vents enables different layers/groups of preforms in the stack thereof to be directed to different areas of the mold cavity.

For example, consider a mold cavity in which there is a first vent proximal to a first feature of the mold cavity and a second vent proximal to a second feature of the mold cavity. To selectively direct fiber to the first feature, the first vent is opened. To selectively direct fiber to the second feature, the second vent is opened some time after the first vent. If, for example, the first feature of the mold cavity is a relatively small compared to the overall size of the mold cavity, the fibers intended for that region will be smaller than those directed to the major regions of the mold cavity. More particularly, these smaller fibers will be comparable to the size of the first (relatively small) feature. Typically, the smaller fibers will be somewhat longer than the feature to facilitate overlap between those fibers with longer fibers in the major regions of the cavity. Such overlap enhances part strength.

Typically, the first vent does not need to be closed before opening the second vent. In particular, as the first feature fills with fiber and resin, the pressure required to force more material into that feature increases dramatically. Thus, once the second vent opens, material will flow towards the second feature, since the pressure will be lower there a fiber and resin will readily flow thereto. In this example, the opening of the first vent and, after a period of time, the opening of the second vent, both occur during a single plunger stroke.

Furthermore, the orientation of fibers in the mold cavity and, hence, the final part, can be influenced by the orientation of the preforms. Such orientations include the orientation of the preforms (fibers): (1) relative to the stroke direction of the plunger, and/or (2) relative to the axes of the mold. Controlling fiber orientation using these parameters enables off-axis directions of a part to be strengthened.

Moreover, based on the aforementioned ability to control the end location of fibers in the mold cavity, a modulus gradient (i.e., a gradient in Young's modulus) can be established through a part. This can be accomplished, for example, using preforms that differ in fiber type (e.g., some including carbon fiber, others including glass fiber, etc.), and by appropriately organizing them in the stack within the plunger cavity. In conjunction with the selective actuation of vents, the different materials wind up at different locations in the mold cavity.

Alternatively, a modulus gradient can be created by controlling the fiber volume fraction. For example, a first group of preforms can be formed such that the fiber volume fraction is relatively greater than that of a second group of preforms (i.e., there is relatively less resin, as a percentage of the total constituents in the first group of preforms than in the second group of preforms). Using the aforementioned mentioned technique of selective actuation of vents, in conjunction with appropriately stacking the first and second groups of preforms in the mold cavity, the resin and fiber from the first group of preforms can be directed to a first location in the mold, and the resin and fiber from the second group of preforms can be directed to a second location in the mold. This results in the creation of a relatively more fiber-rich region in the first location of the mold, and, hence, the final part, thereby creating the aforementioned modulus gradient.

Also, the strength and stiffness of selected areas of a part can be controlled by using preforms having different lengths. Those parameters can be altered as a function of the extent of fiber overlap in specific regions of the part (i.e., the amount by which longer fibers in the main portion of the part overlap with potentially smaller fibers in a smaller/intricate feature of the part. Once again, this is implemented through the use and selective actuation of vents, and appropriate stacking of preforms having fibers of different lengths and, in some applications, different orientations with respect to the plunger cavity and/or mold cavity.

In summary, some embodiments of the invention utilize a plunger that is out-of-plane with respect to a mold cavity in conjunction with molds for the fabrication of parts via compression molding. In some embodiments, vents are additionally used to assist in directing the movement of fibers to specific regions of the mold cavity. Although vents and plungers are known in the prior art, typically for use in injection molding, such use is distinct from embodiments of the invention. Unlike the prior art, applicants disclose, for some embodiments:

the sequenced actuation of vents, which directs the flow of fibers and resin to specific locations in a mold cavity;

the use of differentiated preforms (e.g., different lengths, different materials, different orientation, etc.) for molding a part;

the use of ordered preform stacking, wherein the differentiated preforms are stacked in a particular order in the mold's plunger cavity; and coordinating sequenced vent actuation with ordered preform stacking.

The techniques provide an unprecedented measure of control over fiber placement in the mold cavity and, hence, a part being molded. Such teachings were unknown in the prior art. Consider, for example, that the feedstock to an injection-molding process is typically homogenous, such that in addition to there being no concept of directing feedstock to different regions in a mold cavity, there was no reason to do so, since the feedstock was undifferentiated.

In accordance with the present teachings, preforms are placed in the plunger cavity. The lowest layer of preforms rests on a portion of the mold cavity. The plunger's stroke axis is out-of-plane to a major surface of the mold cavity. In the illustrative embodiment, the plunger's stroke axis is 90 degrees out-of-plane (i.e., orthogonal) to a major surface of the mold cavity. In some other embodiments, the plunger's stroke axis is greater than 45 degrees out-of-plane to a major surface of the mold cavity. By virtue of the orientation of plunger/plunger cavity with respect to the mold, initial movement of fibers in the mold cavity (as the fiber moves away from its position in the stack) is via a shear force.

In a first embodiment, the invention provides a method comprising: advancing a plunger through a plunger cavity, the advancing plunger forcing liquefied resin and a plurality of fibers, sourced from a plurality of preforms, from the plunger cavity into a mold cavity;

preferentially flowing liquefied resin and a first group of fibers of the plurality thereof toward a first region in the mold cavity; and after the liquefied resin and first group of fibers flow to the first region of the mold cavity, preferentially flowing liquefied resin and a second group of fibers of the plurality thereof toward a second region in the mold cavity.

In a second embodiment, and further to the first embodiment, preferentially flowing liquefied resin and a first group of fibers further comprises reducing pressure in the first region relative to other regions of the mold cavity.

In a third embodiment, and further to the second embodiment, reducing pressure in the first region further comprises actuating a first vent that is fluidically coupled to the first region.

In a fourth embodiment, and further to the second embodiment, preferentially flowing liquefied resin and a second group of fibers further comprises reducing pressure in the second region relative to other regions of the mold cavity.

In a fifth embodiment, and further to the fourth embodiment, reducing pressure in the first region further comprises actuating a first vent that is fluidically coupled to the first region; and reducing pressure in the second region further comprises actuating a second vent that is fluidically coupled to the second region.

In a sixth embodiment, and further to the first embodiment, the plurality of preforms comprises a first group of preforms having the first group of fibers and a second group of preforms having a second group of fibers, wherein the first and second group of preforms differ from one another as to at least one characteristic.

In a seventh embodiment, and further to the sixth embodiment, the at least one characteristic is selected from the group consisting of a length of the fibers of the preforms, a composition of the fibers of the preforms, and a fiber volume fraction of the preforms.

In an eighth embodiment, and further to the sixth embodiment, the one characteristic is a length of the fibers of the preforms, and wherein the first group of preforms has relatively shorter fibers than the second group of preforms, the method further comprising sequencing the first group and second group of preforms in a stack in the plunger cavity such that the first group is positioned relatively closer to the mold cavity.

In a ninth embodiment, and further to the sixth embodiment, the spatial orientation of the first group of preforms and the second group of preforms in the plunger cavity differs from one another.

In a tenth embodiment, and further to the first embodiment, a method further comprising adding a preform to the mold cavity before advancing the plunger.

In an eleventh embodiment, and further to the sixth embodiment, the method further comprises coordinating the order in which the first group of preforms and the second group of preforms are stacked in the plunger cavity with the sequence in which the first group of fibers and the second group of fibers are preferentially flowed toward respective first and second regions of the mold cavity.

In a twelfth embodiment, the invention provides a method for molding comprising:
ordering, in a stack within a plunger cavity, first and second groups of preforms, each group comprising plural preforms, each preform comprising resin-coated fibers, wherein the first group of preforms and the second group of preforms differ from one another as to at least one characteristic;
liquefying the resin;
advancing a plunger through the plunger cavity to force, into a mold cavity, fibers and resin from the two groups of preforms; and
actuating, in sequence, a first vent and then a second vent, wherein:
the first vent is fluidically coupled to a first region of the mold cavity, the second vent is fluidically coupled to a second region of the mold cavity,
actuation of the first vent results in preferential flow of fiber to the first region,
actuation of the second vent results in preferential flow of fiber to the second region,
and wherein the ordering of preforms in the stack and the sequencing of actuation of the vents are coordinated so that fibers from the first group of preforms flow to the first region and fibers from the second group of preforms flow to the second region.

In a thirteenth embodiment, and further to the twelfth embodiment, a method comprising cooling the fibers and resin to create a composite part.

In a fourteenth embodiment, and further to the twelfth embodiment, ordering, in a stack, further comprises providing a first spatial orientation to the first group of preforms and a second spatial orientation to the second group of preforms in the plunger cavity.

In a fifteenth embodiment, and further to the fourteenth embodiment, the first spatial orientation and the second spatial orientation are individually selected from the group consisting of axially aligned with respect to the plunger cavity, transversely aligned with respect to the plunger cavity, axially aligned with respect to the mold cavity, transversely aligned with respect to the mold cavity.

In a sixteenth embodiment, and further to the fourteenth embodiment, the first group of preforms and the second group of preforms are transversely aligned with respect to the plunger cavity, and are neither orthogonal nor parallel to one another.

In a seventeenth embodiment, the invention provides a method for molding comprising:
placing a first group of preforms in a first orientation in a plunger cavity;
placing a second group of preforms in a second orientation in the plunger cavity, where the second group of preforms is placed on top of the first group of preforms;
advancing a plunger in the plunger cavity to force fibers and resin from the first group of preforms into a mold cavity;
directing fibers from the first group of preforms to a first region of the mold cavity;
advancing the plunger in the plunger cavity to force fibers and resin from the second group of preforms into the mold cavity; and
directing fibers from the second group of preforms to a second region of the mold cavity.

In a eighteenth embodiment, and further to the seventeenth embodiment, directing fibers from the first group of preforms to a first region further comprises actuating a first vent that is fluidically coupled to the first region of the mold cavity.

In a nineteenth embodiment, and further to the eighteenth embodiment, directing fibers from the second group of preforms to a second region further comprises actuating a second vent that is fluidically coupled to the second region of the mold cavity after the fibers from the first group of preforms flow to the first region of the mold cavity.

In a twentieth embodiment, the invention provides a compression mold comprising:
a plunger cavity;
a plunger that is received by the plunger cavity and moves linearly therein;
a mold cavity, wherein a stroke axis of the plunger within the plunger cavity is out-of-plane with respect to a major surface of the mold cavity, and wherein a cross-sectional area of a mouth of the plunger cavity is substantially smaller than a cross-sectional area of the mold cavity;
a first vent that is fluidically coupled to a first portion of the mold cavity; and
a second vent that is fluidically coupled to a second portion of the mold cavity.

In a twenty-first embodiment, and further to the twentieth embodiment, the first vent is coupled to a feature that is substantially smaller than the major surface of the mold cavity.

In a twenty-second embodiment, and further to the twentieth embodiment, a length of the plunger cavity along the stroke axis is substantially greater than a depth of the mold cavity.

In a twenty-third embodiment, the invention provides a method for molding comprising:
placing a plurality of preforms in a plunger cavity, each preform including fibers coated with resin, a portion of which preforms reside on a surface of a mold cavity, wherein the surface is out-of-plane with respect to the plunger and plunger cavity;
liquefying the resin; and
imparting, via a plunger moving through the plunger cavity, a shear force to the fibers and liquefied resin, thereby causing the fibers and resin to flow through the mold cavity, wherein movement of at least some of the fibers aligns with an axial direction of the mold cavity.

In a twenty-fourth embodiment, and further to the twenty-third embodiment, placing the plurality of preforms in the plunger cavity further comprises aligning at least some of the preforms in a transverse direction with respect to the plunger cavity.

In a twenty-fifth embodiment, and further to the twenty-third embodiment, the plurality of preforms includes a first group of preforms and a second group of preforms, wherein the first and second groups of preforms differ in terms of a first characteristic.

In a twenty-sixth embodiment, and further to the twenty-fifth embodiment, the first characteristic is selected from the group consisting of a length of the fibers of the preforms, a composition of the fibers of the preforms, and a fiber volume fraction of the preforms.

In a twenty-seventh embodiment, and further to the twenty-sixth embodiment, the plurality of preforms are arranged in a stack in the plunger cavity, wherein the first group of preforms are relatively lower in the stack and closer to mold cavity than the second group of preforms, so that the fibers from the first group of preforms flow through the mold cavity before fibers from the second of preforms.

In a twenty-eighth embodiment, and further to the twenty-seventh embodiment, a method comprising directing fibers from the first group of preforms to a first location in the mold cavity and directing fibers from the second group of preforms to a second location in the mold cavity.

In a twenty-ninth embodiment, and further to the twenty-eighth embodiment, the first location comprises a feature that is relatively smaller than any feature associated with the second location.

In a thirtieth embodiment, and further to the twenty-fifth embodiment, the first group of preforms has a spatial orientation different than the second group of preforms with respect to at least one of either the plunger cavity and the mold cavity.

In a thirty-first embodiment, and further to the twenty-third embodiment, a method comprising adding a preform to the mold cavity before liquefying the resin.

In a thirty-second embodiment, and further to the twenty-third embodiment, a major portion of the fibers having a length that is substantially as long as a major axis of the mold cavity.

In a thirty-third embodiment, and further to the twenty-third embodiment, a method comprising cooling mold cavity after the fibers and resin have flowed through the mold cavity.

In a thirty-fourth embodiment, the invention provides a method for molding comprising advancing a plunger through a plunger cavity, the advancing plunger imparting a shear force to the liquefied resin and a plurality of fibers, thereby causing the fibers and resin to flow through the mold cavity, wherein movement of at least some of the fibers aligns with an axial direction of the mold cavity.

In a thirty-fifth embodiment, and further to the thirty-fourth embodiment, the plunger cavity is oriented out-of-plane by at least 45 degrees with respect to a longest axis of the mold cavity.

In a thirty-sixth embodiment, and further to the thirty-fourth embodiment, the liquefied resin and plurality of fibers are sourced from a plurality of preforms that are situated in the plunger cavity.

In a thirty-seventh embodiment, and further to the thirty-sixth embodiment, the plurality of preforms includes at least two groups of preforms, wherein the two groups differ as to at least one characteristic.

In a thirty-eighth embodiment, and further to the thirty-seventh embodiment, the at least one characteristic relates to a composition of the preforms.

In a thirty-ninth embodiment, and further to the thirty-seventh embodiment, the least one characteristic relates to a spatial orientation of the preforms.

In a fortieth embodiment, and further to the thirty-seventh embodiment, a method comprising stacking the two groups of preforms in the plunger cavity, wherein the stack is ordered, wherein the group of preforms first in order enters the mold cavity first and flows to a first region in the mold cavity, and the group of preforms second in the order enters the mold cavity second and flows to a second region in the mold cavity.

In a forty-first embodiment, the invention provides a compression mold comprising:
a plunger cavity;
a plunger that is received by the plunger cavity and moves linearly therein, and
a mold cavity, wherein a stroke axis of the plunger within the plunger cavity is aligned with an axis that is out-of-plane with respect to a major surface of the mold cavity, and wherein a cross-sectional area of a mouth of the plunger cavity is substantially smaller than a cross-sectional area of the mold cavity.

In a forty-second embodiment, and further to the forty-first embodiment, the stroke axis of the plunger is ninety degrees out-of-plane with respect to the major surface of the mold cavity.

In a forty-third embodiment, and further to the forty-first embodiment, the stroke axis of the plunger is in a range of ninety degrees to forty-five degrees out-of-plane with respect to a major surface of the mold cavity.

In a forty-fourth embodiment, and further to the forty-first embodiment, a length of the plunger cavity along the stroke axis is substantially larger than a depth of the mold cavity.

In a forty-fifth embodiment, the invention provides a compression mold comprising:
- a plunger cavity;
- a plunger that is received by the plunger cavity and moves linearly therein, and
- a mold cavity, wherein a length of the plunger cavity along the stroke axis is substantially greater than a depth of the mold cavity.

In a forty-sixth embodiment, and further to the forty-fifth embodiment, a cross-sectional area of a mouth of the plunger cavity is substantially smaller than a cross-sectional area of the mold cavity.

Additional embodiments of the invention comprise any other non-conflicting combination of features recited in the above-disclosed embodiments.

DETAILED DESCRIPTION

Figure 1:
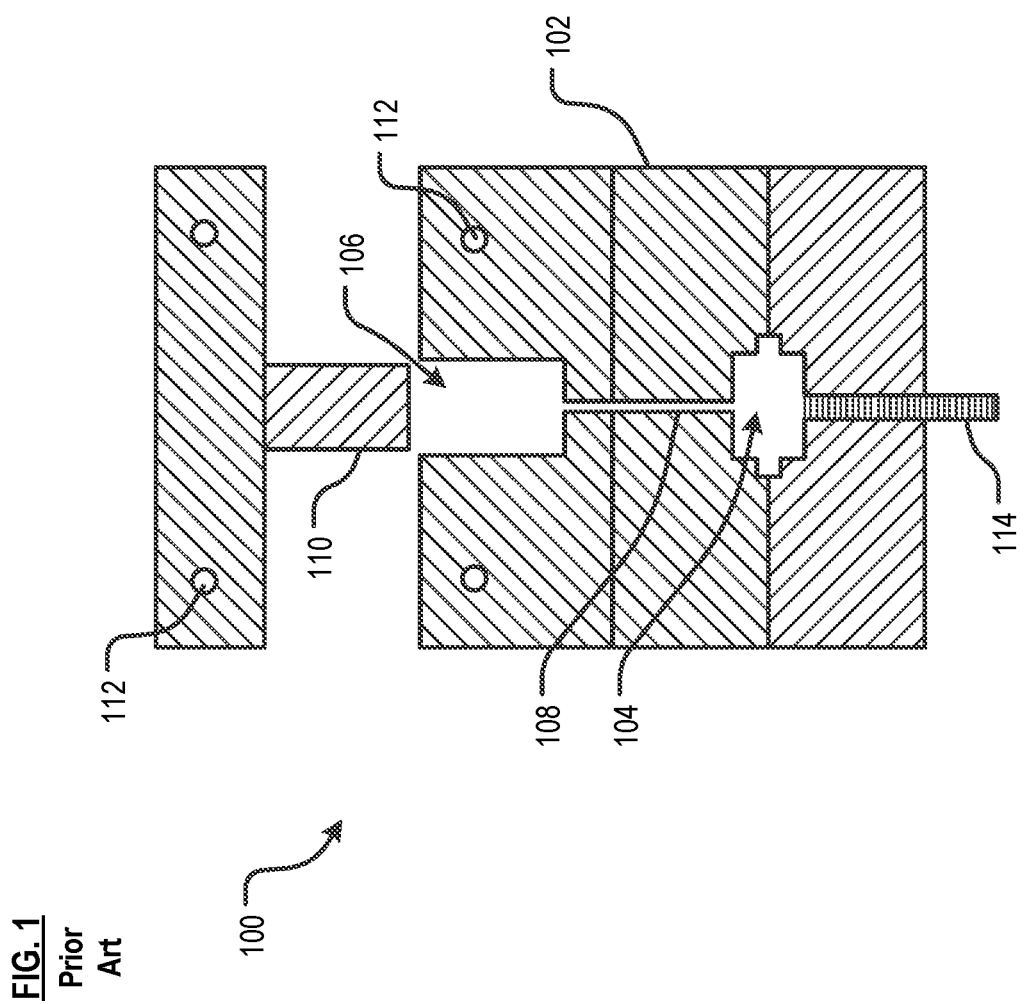
FIG. 1 depicts a conventional transfer molding apparatus.

The following terms, and their inflected forms, are defined for use in this disclosure and the appended claims as follows:

"Axial direction or Axially aligned" means, for example, in the context of a plunger or plunger cavity, aligned with the stroke direction of the plunger and, in the context of a mold cavity, means aligned with the long(est) or major axis of the mold cavity.

"Transverse or Transversely aligned" means, for example, in the context of a plunger or plunger cavity, orthogonal to the stroke direction of the plunger and, in the context of a mold cavity, aligned with an axis that is rotated 90 degrees, in-plane, with respect to the long(est)/major axis of the mold cavity.

"Out-of-plane" means, for example, in the context of a mold cavity, aligned with an axis that is rotated out of the plane of the major surface of the mold cavity. In embodiments of the invention, the stroke axis of the plunger is out-of-plane with respect to a major surface of the mold cavity.

"Fiber" means an individual strand of material. A fiber has a length that is much greater than its diameter. For use herein, fibers are classified as (i) continuous or (ii) short. Continuous fibers have a length that is about equal to to the length of a major feature of a mold in which they are placed. And, similarly, continuous fibers have a length that is about equal to that of the part in which they will reside. Short fibers have a length that is shorter than the length of a major feature of the mold in which they are placed, and typically comparable to the length of minor features of the mold, plus some additional length to enable "overlap" with other fibers, such as continuous fibers. The term "short fiber," as used herein, is distinct from the "chopped fiber" or "cut fiber," as those terms are typically used in the art. In the context of the present disclosure, short fiber is present in a preform and, as such, will have a defined orientation in the preform, the mold, and the final part. As used generally in the art, chopped or cut fiber has a random orientation in a mold and the final part. Additionally, as used herein, the length of "short fiber" will be based on the length of the smaller features of a mold (they will be comparable in length). In contrast, the length of chopped or cut fiber typically bears no predefined relationship to the length of any feature of a mold/part.

"Stiffness" means resistance to bending, as measured by Young's modulus.

"Tensile strength" means the maximum stress that a material can withstand while it is being stretched/pulled before "necking" or otherwise failing (in the case of brittle materials).

"Continuous" fiber or fiber bundles means fibers/bundles having a length that is about equal to the length of a major feature of a mold in which the fiber/bundles are placed.

"Tow" means a bundle of fibers, and those terms are used interchangeably herein unless otherwise specified. Tows are typically available with fibers numbering in the thousands: a 1K tow, 4K tow, 8K tow, etc.

"Prepreg" means fibers that are impregnated with resin.

"Towpreg" or "Prepreg Tow" means a fiber bundle (i.e., a tow) that is impregnated with resin.

"Preform" means a sized, or sized and shaped portion of tow/tow-preg, wherein the cross section of the fiber bundle has an aspect ratio (width:thickness) of between about 0.25 to about 6. The term preform explicitly excludes sized/shaped (i) tape (which typically has an aspect ratio—cross section, as above—of between about 10 to about 30), (ii) sheets of fiber, and (iii) laminates.

"About" or "Substantially" means +/−20% with respect to a stated figure or nominal value.

Other than in the examples, or where otherwise indicated, all numbers expressing, for example, quantities of ingredients used in the specification and in the claims are to be understood as being modified in all instances by the term "about." Accordingly, unless indicated to the contrary, the numerical parameters set forth in the following specification and attached claims are understood to be approximations that may vary depending upon the desired properties to be obtained in ways that will be understood by those skilled in the art. Generally, this means a variation of at least +/−20%.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10.

The fiber bundles that are sized or sized and shaped to form preforms for use herein includes thousands of individual fibers, typically in multiples of a thousand (e.g., 1 k, 10 k, 24 k, etc.). Such fiber bundles are typically called "tow." In some embodiments, the fibers in the tow are impregnated with a polymer resin; such material is referred to as "towpreg" or "prepreg tow." Although all of the towpreg depicted in the Figures are cylindrical (i.e., have a circular cross section), they can have any suitable cross-sectional shape (e.g., oval, trilobal, polygonal, etc.).

The individual fibers can have any diameter, which is typically, but not necessarily, in a range of 1 to 100 microns. Individual fibers can include an exterior coating such as, without limitation, sizing, to facilitate processing, adhesion of binder, minimize self-adhesion of fibers, or impart certain characteristics (e.g., electrical conductivity, etc.).

Each individual fiber can be formed of a single material or multiple materials (such as from the materials listed below), or can itself be a composite. For example, an individual fiber can comprise a core (of a first material) that is coated with a second material, such as an electrically conductive material, an electrically insulating material, a thermally conductive material, or a thermally insulating material.

In terms of composition, each individual fiber can be, for example and without limitation, carbon, glass, natural fibers, aramid, boron, metal, ceramic, polymer filaments, and others. Non-limiting examples of metal fibers include steel, titanium, tungsten, aluminum, gold, silver, alloys of any of the foregoing, and shape-memory alloys. "Ceramic" refers to all inorganic and non-metallic materials. Non-limiting examples of ceramic fiber include glass (e.g., S-glass, E-glass, AR-glass, etc.), quartz, metal oxide (e.g., alumina), aluminasilicate, calcium silicate, rock wool, boron nitride, silicon carbide, and combinations of any of the foregoing. Furthermore, carbon nanotubes can be used.

Any thermoplastic can be used in conjunction with embodiments of the invention. Exemplary thermoplastic resins useful in conjunction with embodiments of the invention include, without limitation, acrylonitrile butadiene styrene (ABS), nylon, polyaryletherketones (PAEK), polybutylene terephthalate (PBT), polycarbonates (PC), and polycarbonate-ABS (PC-ABS), polyetheretherketone (PEEK), polyetherimide (PEI), polyether sulfones (PES), polyethylene (PE), polyethylene terephthalate (PET), polyphenylene sulfide (PPS), polyphenylsulfone (PPSU), polyphosphoric acid (PPA), polypropylene (PP), polysulfone (PSU), polyurethane (PU), polyvinyl chloride (PVC). An exemplary thermoset is epoxy.

The equipment used in conjunction with embodiments of the present invention have some similarities to a process known as "transfer molding." FIG. 1 depicts conventional apparatus 100 for forming a part via a transfer-molding process.

Apparatus 100 includes mold 102, mold cavity 104, transfer pot 106, sprue 108, plunger 110, heaters 112, and ejector pin 114, arranged as shown. A feed, which is usually a plastic/resin, is placed in transfer pot 106. Plunger 110 is moved downwardly into transfer pot 106, compressing the plastic in the mold. Heaters 112 heat the mold to a temperature that is sufficient to melt the plastic. The liquid plastic then flows through sprue 108 under pressure and into mold cavity 104. Sprue(s) 108 (there may be several) is typically a small cylindrical opening that leads from transfer pot 106 to mold cavity 104. After the part is formed and the mold is opened, ejector pin 114 is used to push the part out of mold cavity 104. By virtue of the structural arrangement of the apparatus 100, such as the presence of the sprues, fiber, particularly continuous fiber, is typically not used in conjunction with this transfer molding process. To the extent that the feed includes any fiber, it is usually "chopped" fiber, so that it could fit through the sprue.

Figure 2A:
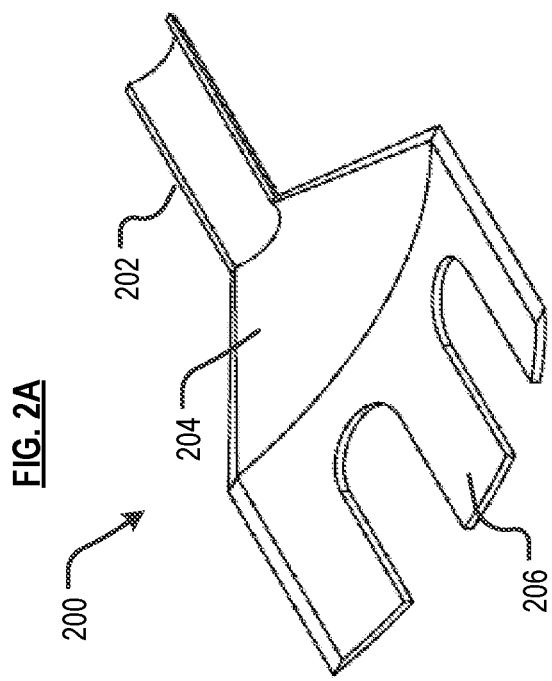
FIG. 2A depicts part 200.

FIG. 2A depicts scoop 200. The scoop includes handle 202, body 204, and fingers or tines 206. Scoop 200 is very thin and has a relatively elongated form. For a part having such a configuration, it is important that part stiffness and strength are oriented in the direction of the long axis of the handle. This reduces any tendency for the part to snap under flexion, such as could occur, for example, if tines 206 were immobilized in the ground and excessive upward or downward pressure is applied at handle 202. It is also necessary that the tines are well connected to the handle via body 204 in strength and stiffness.

Figure 2B:
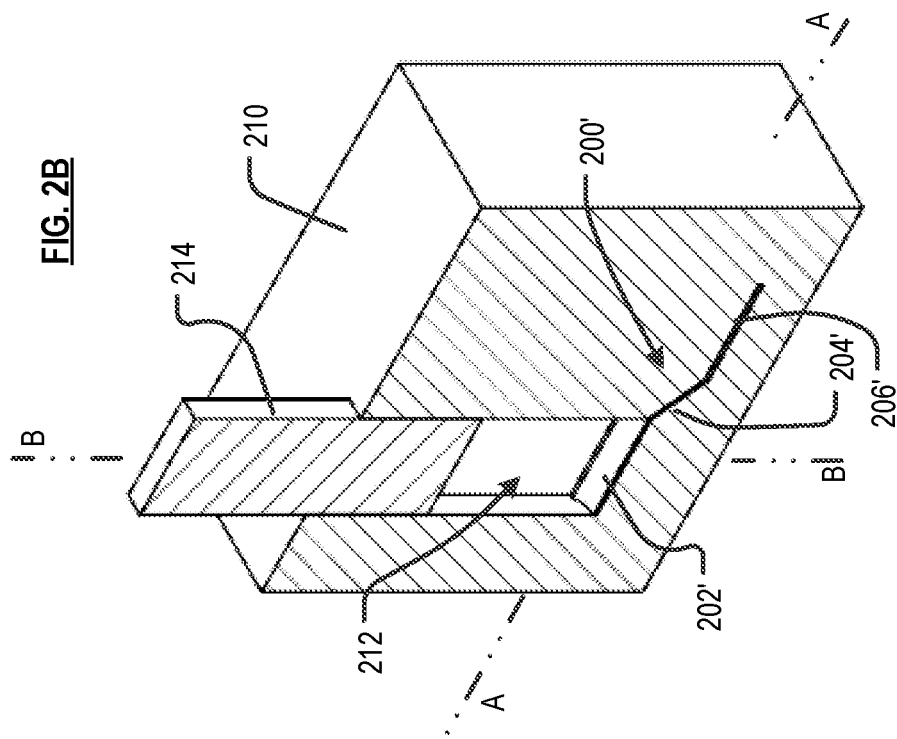
FIG. 2B depicts a composite molding apparatus for making part 200.
Figure 2D:
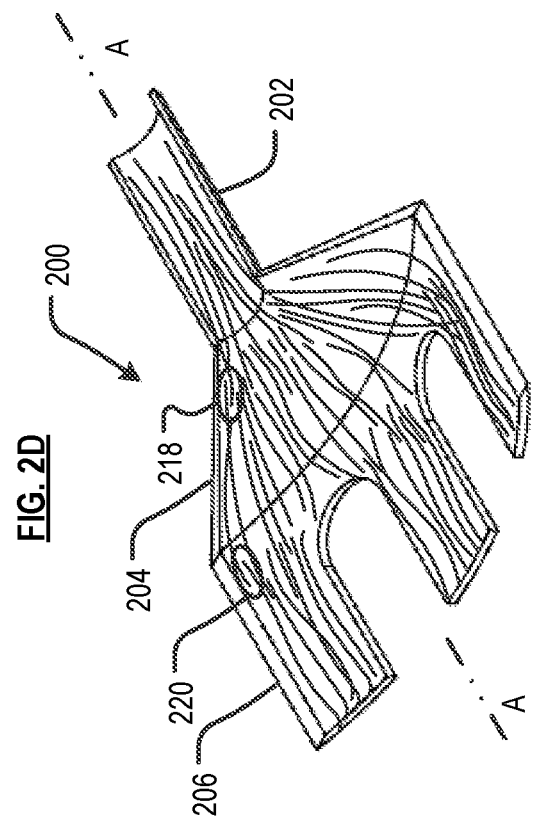
FIG. 2D depicts a notional illustration of the distribution of fibers within part 200 based on the first arrangement of fiber bundles in FIG. 2C.
Figure 2C:
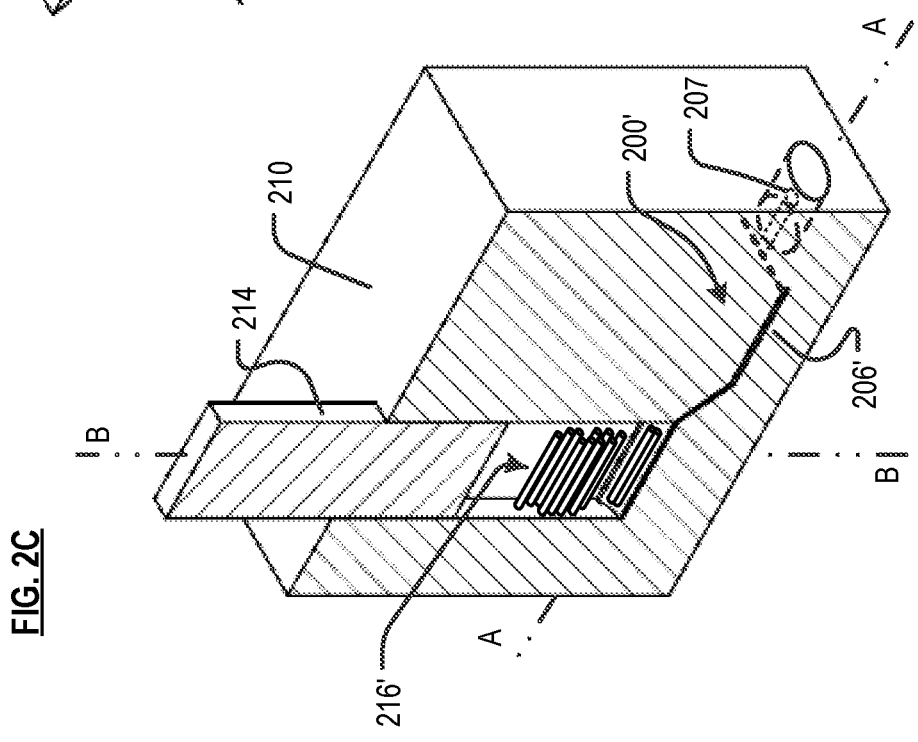
FIG. 2C depicts a first arrangement of fiber bundles, situated in the apparatus of FIG. 2B, for making part 200 of FIG. 2A.

FIGS. 2B and 2C depict mold 210 for making scoop 200. The mold includes mold cavity 200', including cavity portions 202', 204', and 206' for forming respective portions of the scoop; that is, handle 202, body 204, and tines 206. Plunger 214 is received by plunger cavity 212 in mold 210, and is arranged to move linearly therein. Note that stroke axis B-B of plunger 214 is out-of-plane with respect to mold cavity 200'. In fact, stroke axis B-B is out-of-plane and orthogonal with respect to cavity portions 202' and 206'.

In mold 210, as in many molds consistent with the present teachings:
- the stroke axis of the plunger is out-of-plane with respect to a major surface of the mold cavity by an amount within the range of 45 to 90 degrees;
- the cross-sectional area of the mouth of the plunger cavity is substantially smaller than the cross-sectional area of the mold cavity;
- the length of the plunger cavity along the stroke axis is substantially greater than a depth of the mold cavity.

The material that is used to form the part; that is, preforms 216', are positioned within plunger cavity 212 on a portion of mold cavity 200'; in this embodiment, on portion 202'. The embodiment shown in FIG. 2C depicts a first arrangement of preforms 216', wherein the preforms are oriented horizontally, which is out-of-plane and, in fact, orthogonal with respect to the plunger's stroke axis, B-B (i.e., the direction/axis along which plunger 214 moves). Furthermore, preforms 216' are axially aligned with mold cavity 200'; that is, they are aligned with axis A-A.

The number of preforms 216' that are required for fabricating scoop 200 (or any part) is determined by matching the mass of the preforms to the mass of the fabricated scoop. In this embodiment, the length of preforms 216' matches the width of plunger cavity 212. The preforms could be shorter, but relatively longer fibers ultimately result in better material properties for the finished part.

FIG. 2D depicts a representation of the orientation of the fibers (from preforms 216') in the molded part; that is, scoop 200. During fabrication, fibers tend to flow along the direction of the long axis of the part, which is axis A-A in this embodiment. For this particular part, the fibers follow the long axis of handle 202 before fanning out through body 204 of scoop 200, and ultimately flowing into tines 206. The fibers overlap, as illustrated, for example, at locations 218 and 220, which provides considerable stiffness and strength to the scoop 200. It will be appreciated that there are many more fibers, and many more incidents of overlap thereof, in an actual part made in accordance with the present teachings.

Furthermore, the degree of fiber overlap can be varied based on fiber length and parameters that affect the final position of the fibers in the mold cavity, such as vents. That is, sequencing the actuation of vents 207 during the stroke of the plunger 214 can provide a staged delivery of fibers. FIG. 2C depicts vent 207; one such vent is fluidically coupled to the terminus of each tine (only one is depicted in FIG. 2C) of the mold-cavity. Vents and their operation are discussed in greater detail in conjunction with FIGS. 2I through 2L, later in this specification.

Figure 2F:
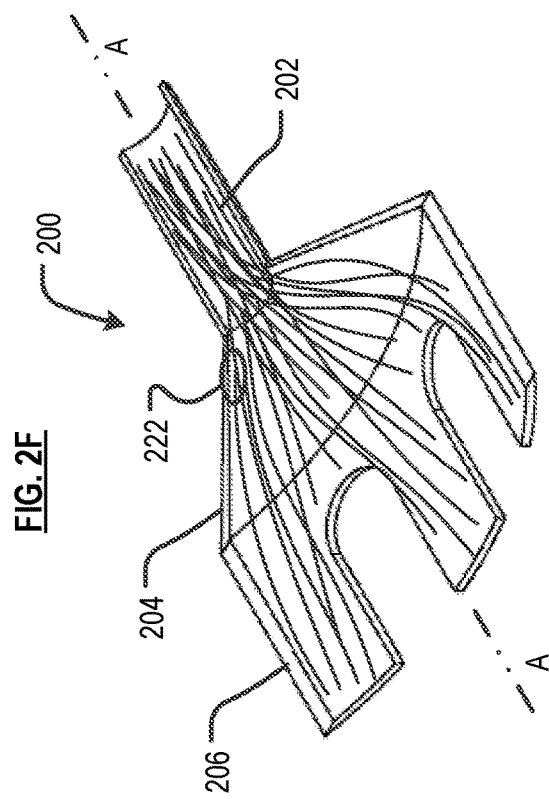
FIG. 2F depicts a notional illustration of the distribution of fibers within part 200 based on the second arrangement of fiber bundles in FIG. 2E.
Figure 2E:
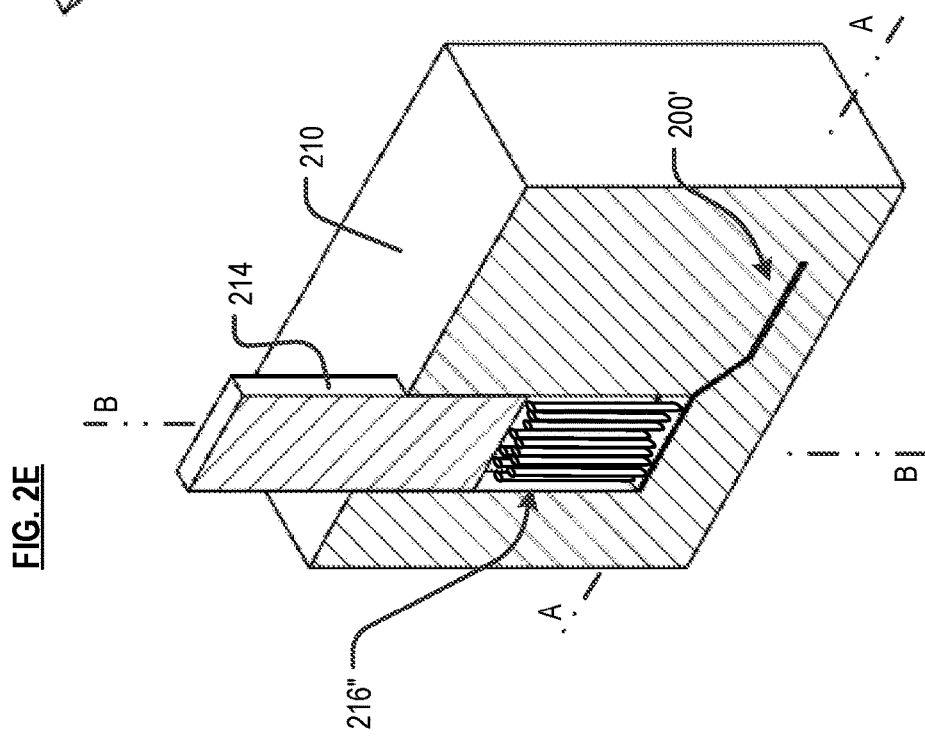
FIG. 2E depicts a second arrangement of fiber bundles, situated in the apparatus of FIG. 2B, for making part 200 of FIG. 2A.

FIG. 2E depicts, for the same mold 210, preforms 216", which are arranged in a second arrangement that is different from the first arrangement shown in FIG. 2C. In particular, preforms 216" are oriented vertically, which is "axially aligned" with respect to the plunger's stroke-axis B-B. Since, in mold 210, plunger cavity 212 is longer than it is wide, preforms 216" may be longer than preforms 216' of FIG. 2C. As previously noted, longer fibers, such as are present in preforms 216" relative to preforms 216', typically result in better material properties for the finished part.

Once again, vents (not depicted in FIG. 2E) are used to facilitate the movement of fibers to specific regions (e.g., the tines, etc.) and control the extent of overlap with other fibers.

FIG. 2F depicts a representation of the orientation of the fibers (from preforms 216") in scoop 200. As in the embodiment depicted in FIG. 2D, the fibers tend to align with the long axis of the part, and overlap, as illustrated at location 222, for example.

Figure 2H:
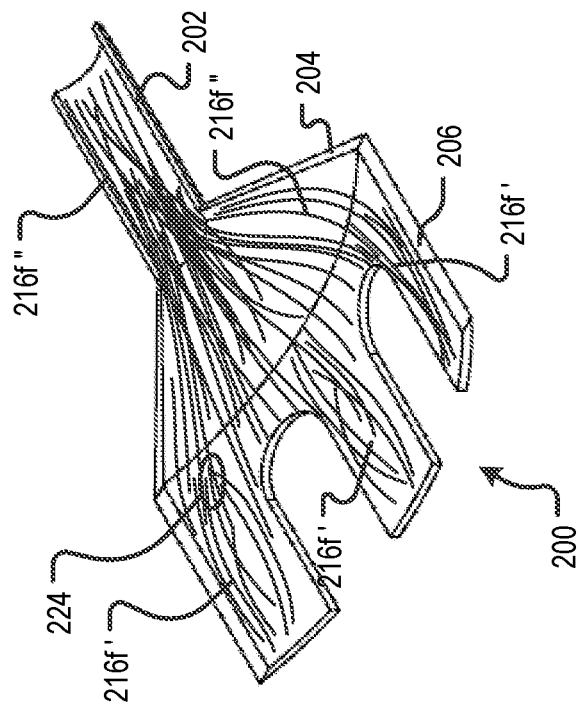
FIG. 2H depicts a notional illustration of the distribution of fibers within part 200 based on the third arrangement of fiber bundles depicted in FIG. 2G.
Figure 2G:
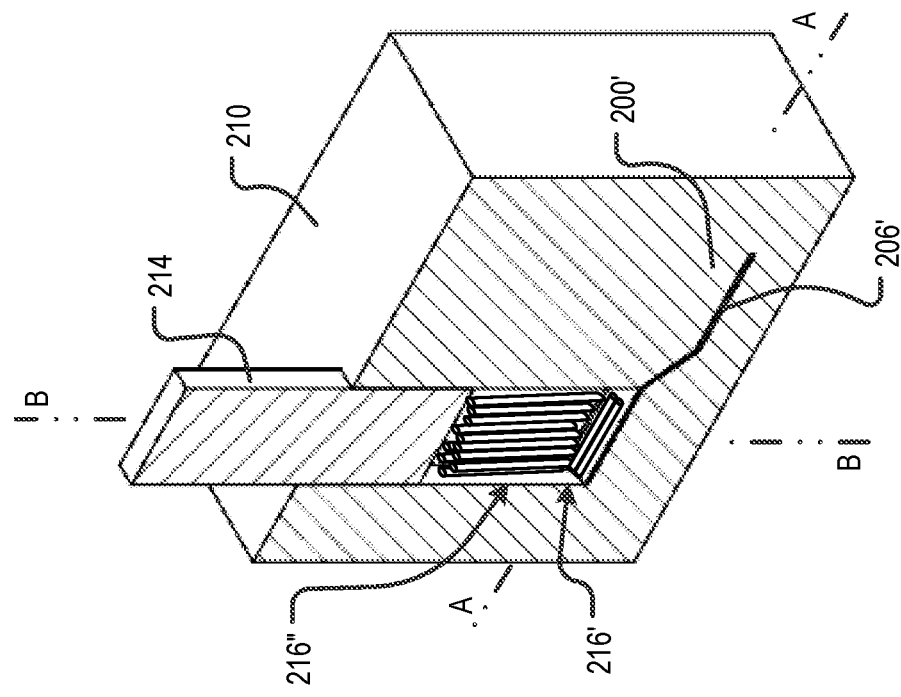
FIG. 2G depicts a third arrangement of fiber bundles, situated in the apparatus of FIG. 2B, for making part 200 of FIG. 2A.

FIG. 2G depicts, a third arrangement of preforms in mold 210, wherein relatively shorter preforms 216' are oriented horizontally and axially aligned with mold cavity 200' (i.e., parallel to axis A-A), and preforms 216" are oriented vertically, axially aligned with the plunger cavity (i.e., parallel to axis B-B), and are positioned on top of preforms 216'.

For very thin features, such as are present in scoop 200, it can be beneficial to use such a combination of shorter fibers and longer fibers. The shorter fibers more reliably fill any thin/small/intricate features. Meanwhile, the longer and shorter fibers intermingle and overlap, thereby coupling the thin/intricate feature to the rest of the part.

For example, in scoop 200, if mold filling is an issue, fibers from shorter preforms 216' at the bottom of the feed stack would flow first into cavity portion 206' (the tines), and more easily fill this portion than would longer fibers from preforms 216". Although not depicted, vents, as previously discussed, are advantageously fluidically coupled to the terminus of each of the tines (i.e., mold-cavity portion 206'). Referring now to FIG. 2H, longer fibers 216f" from preforms 216" located higher in the feed stack would mix with shorter fibers 216f' from preforms 216', overlapping, such as at location 224, to connect the tips of tines 206 to the rest of scoop 200.

Figure 2I:
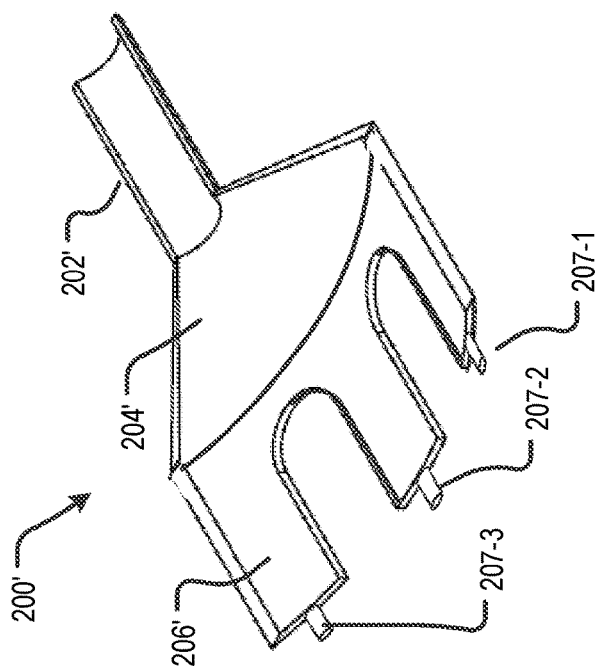
FIG. 2I depicts the mold cavity of for making part 200 of FIG. 2A, showing vents at the terminus of the tines.

FIG. 2I depicts mold cavity 200' without the surrounding mold 210. Vents 207-1, 207-2, and 207-3 are individually fluidically coupled to the terminus of a respective tine. There are instances in which it will be desirable to have fiber of a first characteristic fill some but not all of the tines of the mold cavity, whereas fiber having a second characteristic fills the remaining tines.

For example, one or more of the tines may differ in length from the other tines, or one or more of the tines may experience greater stresses during use than other of the tines. In such cases, the longer tines or tines experiencing greater stresses would benefit from relatively longer fibers, or fibers made from a relatively stronger material, or from material having a relatively higher fiber-volume fraction.

To direct two (or more) groups of preforms having fibers that differ in some characteristic to different locations in a mold requires that the two (or more) groups of preforms be stacked in an appropriate order in the plunger cavity. Thus, when the plunger is actuated (to force fiber and liquefied resin into the mold cavity), and an appropriate one or more vents are actuated (to create a decrease in pressure at certain discrete regions of the mold cavity), fibers from the group of preforms lowest in the plunger cavity enter the mold cavity (along with liquefied resin) and flow to such discrete regions. After those discrete regions fill, and with the plunger still moving downwardly, and one or more different vents actuating, fiber from the next group of preforms in the stack (along with liquefied resin) enters the mold cavity and flow to fill other portions of the mold cavity that are at reduced pressure.

Figure 2J:
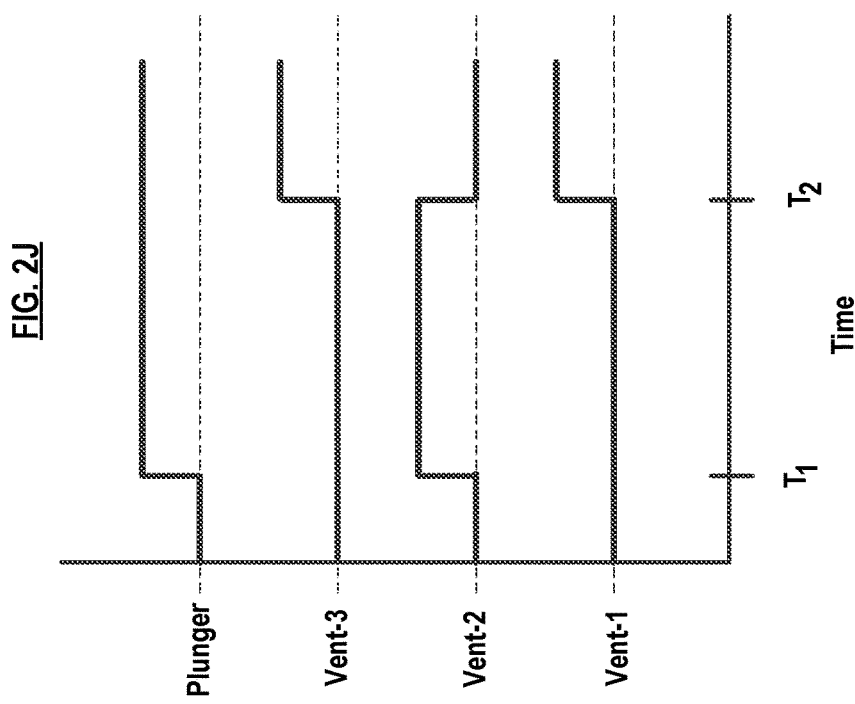
FIG. 2J depicts a timing diagram for actuating the vents and plungers of the mold cavity depicted in FIG. 2I.

With continuing reference to FIG. 2I, and referring also to the timing diagram of FIG. 2J, "Vent-1" corresponds to vent 207-1, "Vent-2" corresponds to vent 207-2, and "Vent-3" corresponds to vent 207-3. Vent-1 and Vent-3 control portions of the mold cavity that correspond to "the outer tines," and Vent-2 controls the portion of the mold cavity that corresponds to "the central tine." The central tine is to be filled first, followed by the outer tines, then the rest of the mold cavity. An appropriate amount of a first type of preforms for filling the central tine is placed at the bottom of the plunger cavity. An appropriate amount of a second type of preforms for filling the outer tines is placed on top of the first type of preforms. Additional preforms would be placed on top of the second type of preforms for filling the balance of the body (204') and handle (202') portions of the mold cavity.

At time $T_1$, the plunger (e.g., plunger 214, FIG. 2G) is actuated, moving downwardly to force fibers and now-liquefied resin into mold cavity 200'. Also at time $T_1$, Vent-2 is actuated (i.e., opened). Actuation of this vent creates relatively lower pressure in the central tine as compared to the outer tines. Consequently, fibers and resin flow to fill the central tine. By time $T_2$, the central tine has filled with resin and the appropriate type of fiber, and Vent-1 and Vent-3 are actuated to create relatively lower pressure in the outer tines versus the central tine and other regions of the mold cavity. Note that the plunger is still moving downwardly, forcing fiber and liquefied resin into the mold cavity. Although FIG. 2J depicts Vent-2 being closed at time $T_2$, that is not necessary, since as a region fills with material, the pressure it would take to force further fiber into the region increases significantly. The fiber and resin will thus preferentially flow elsewhere; in this case, to the outer tines.

Actuation of later-opened vents (such as Vent-1 and Vent-3) can be controlled passively, using relief valves on the vents, for example. In such an embodiment, when the pressure in the mold cavity exceeds some value (as discrete regions fill while fiber and resin continue to be forced into the mold cavity), the relief valve actuates, thereby opening the initially closed vent. Alternatively, the vents can be actively controlled, such as by using position control on the plunger and controlling for volume. That is, knowing how much material is forced into the mold cavity per unit movement of the plunger, and how much material must be delivered to fill portions of the mold cavity that are to be filled first, one can determine the requisite change in position of the plunger to deliver that amount of material. Thus, once the plunger moves the determined amount, a second set of vents are actuated.

Figure 2L:
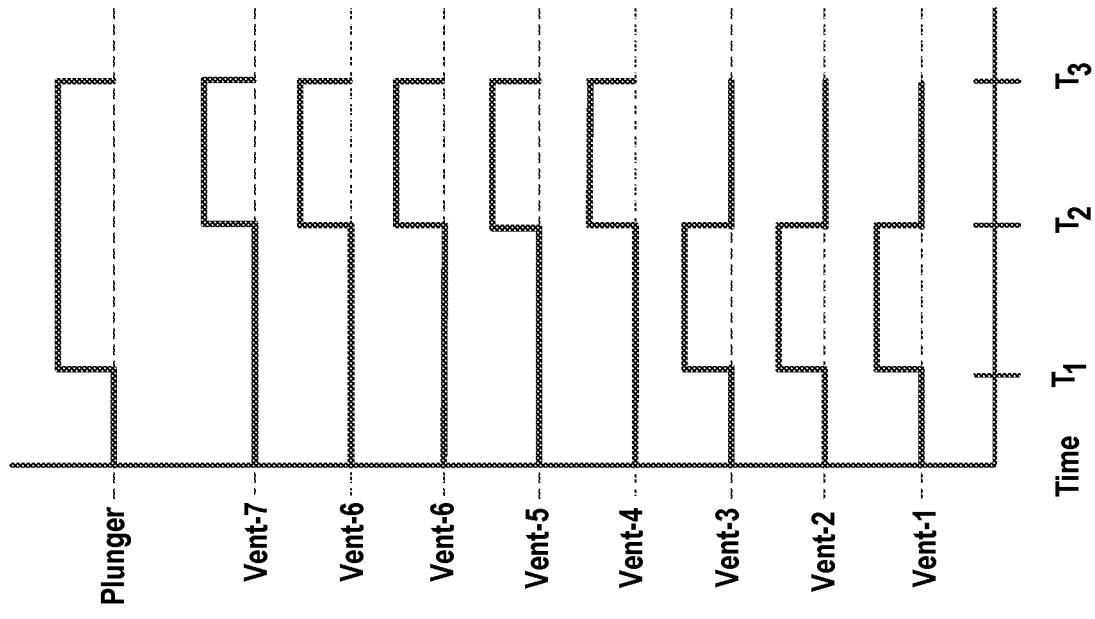
FIG. 2L depicts a timing diagram for actuating the vents and plungers of the mold cavity depicted in FIG. 2K.
Figure 2K:
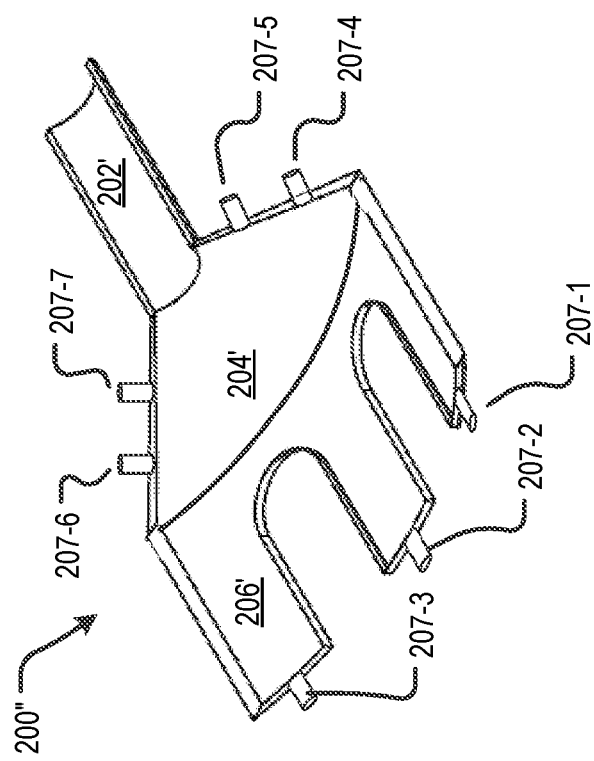
FIG. 2K depicts the mold cavity of for making part 200 of FIG. 2A, showing vents at the terminus of the tines and along the side of the body of the mold cavity.

FIG. 2K depicts mold cavity 200", which is another embodiment of a mold for making scoop 200 of FIG. 2A. In addition to having a vent at the terminus of each tine, mold cavity 200" includes four vents 207-4, 207-5, 207-6, and 207-7, two of which are fluidically coupled to each side of body portion 204' of the mold cavity. These vents can be used to create a crossing overlap between fibers in the tines and fibers in other portions of the scoop.

FIG. 2L depicts a timing diagram that illustrates a mold-filling process. For this example, it is assumed that the tines receive one type of fiber, and the rest of the mold receives a second type of fiber. The fibers that are primarily intended for the tines are about 1.5 times longer than the tines. The fibers that are primarily intended for the balance of the mold cavity are about 2.5 times the length of the tines. A first group of preforms having fibers intended for the tines are placed into the plunger cavity, followed by a second group of preforms having fibers intended for the rest of the mold cavity. Relatively shorter preforms 216' and relatively longer preforms 216" shown stacked in the plunger cavity in FIG. 2G is illustrative.

The amount of fiber and resin in the first group of preforms is sufficient to fill the tines. The second group of preforms includes the fiber and resin required to fill the rest of the mold cavity.

By time $T_1$, the resin in at least the first (lower) group of preforms is liquefied. At time $T_1$, the plunger as well as Vent-1, Vent-2, and Vent-3 are actuated. The relatively lower pressure in the tines draws the relatively shorter fibers from the first group of preforms into the tines.

At time $T_2$, Vent-4, Vent-5, Vent-6, and Vent-7 are actuated, created low pressure regions to the sides of mold body portion 204'. The plunger continues its downward movement, forcing fiber from the second group of preforms as well as liquefied resin into the mold cavity. The portion of these longer fibers that reside in body portion 204' tend to curve toward either of the sides thereof, crossing the portion of fibers extending from the tines. As previously discussed, the vents need not be closed when the cavity portions they control are filled since it would take a substantially increased pressure to force additional material into those regions.

Figure 3A:
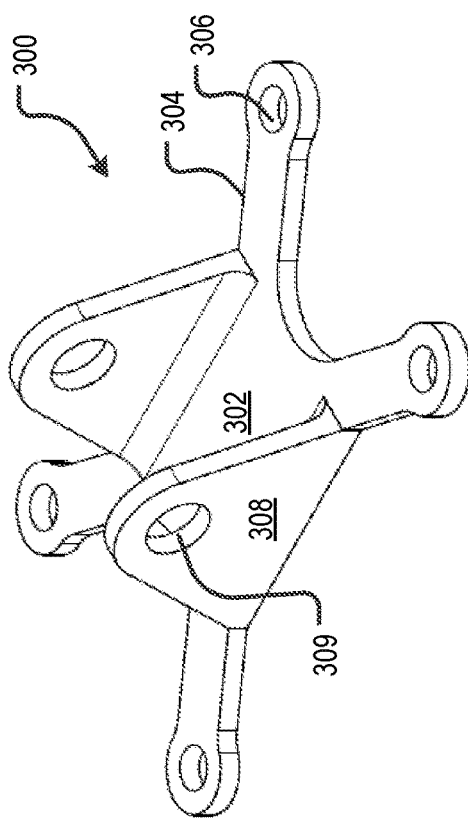
FIG. 3A depicts part 300.

FIG. 3A depicts bracket 300. The bracket includes body 302, four horizontal tabs 304, fastener holes 306, two vertical tabs 308, and rod-receiving holes 309. Bracket 300 can be used, for example, to connect a rod end to a control surface. The rod is received by rod-receiving holes 309. Fastener holes 306 mount bracket 300 to a surface with screws, bolts, pins, etc. Vertical tabs 308 and horizontal tabs 304 are orthogonal to one another. It is desirable to have good bending stiffness in each of tabs 304 and 308 and for all of such tabs to be well connected to one another in strength and stiffness.

Figure 3B:
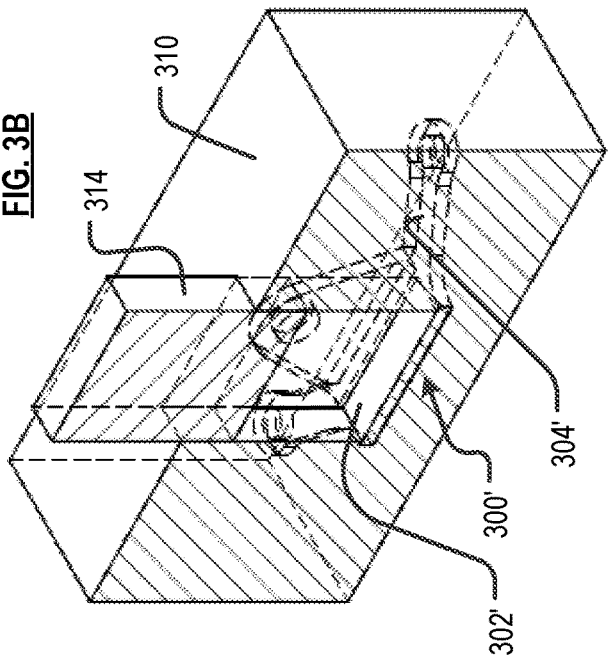
FIG. 3B depicts a composite molding apparatus for making part 300.
Figure 3C:
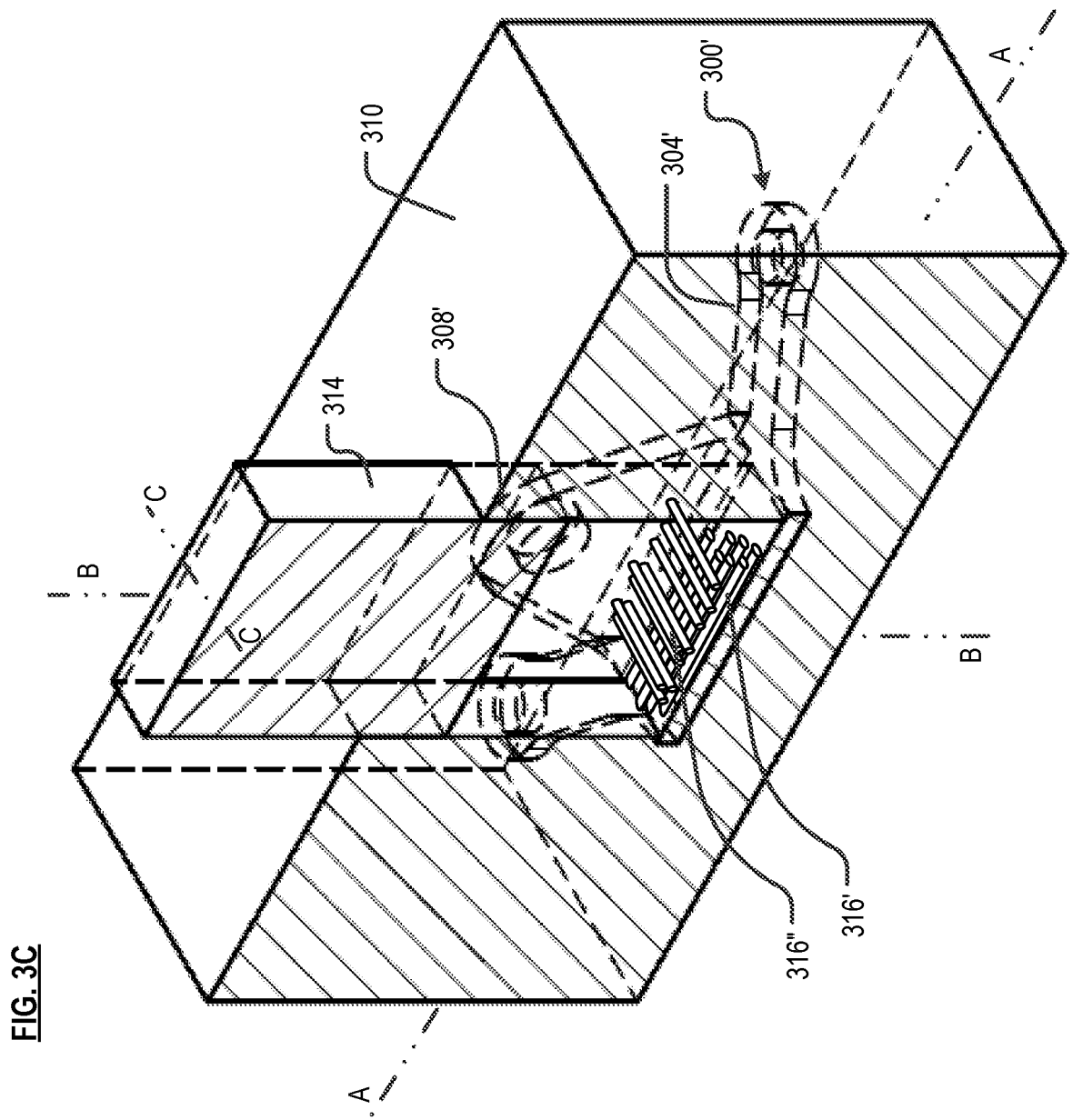
FIG. 3C depicts a first arrangement of fiber bundles, situated in the apparatus of FIG. 3B, for making part 300 of FIG. 3A.

FIGS. 3B and 3C depict mold 310 for making bracket 300. The mold includes mold cavity 300'. Plunger 314 moves linearly along stroke axis B-B (FIG. 3C) in the plunger cavity in mold 310. Otherwise hidden lines of mold 300' are depicted to show how the part is situated in the mold. Parting lines on the mold have been omitted. Once again, stroke axis B-B of plunger 314 is out-of-plane with respect to mold cavity 300' and, in particular, to body portion 302' and horizontal tab portions 304' thereof. Mold 310 also includes sliding pins (not depicted for the sake of clarity) to create holes 306 and 309.

As depicted in FIG. 3C, the preforms that will form the part are organized to have two different orientations in the plunger cavity. Preforms 316' at the bottom of the stack of bundles are aligned with axis A-A, which is the long axis of mold cavity 300'. In other words, fiber bundles 316' are axially aligned with respect to mold cavity 300'. Preforms 316" at the top of stack are aligned with axis C-C, which is transverse to the long axis of mold cavity 300'.

Figure 3D:
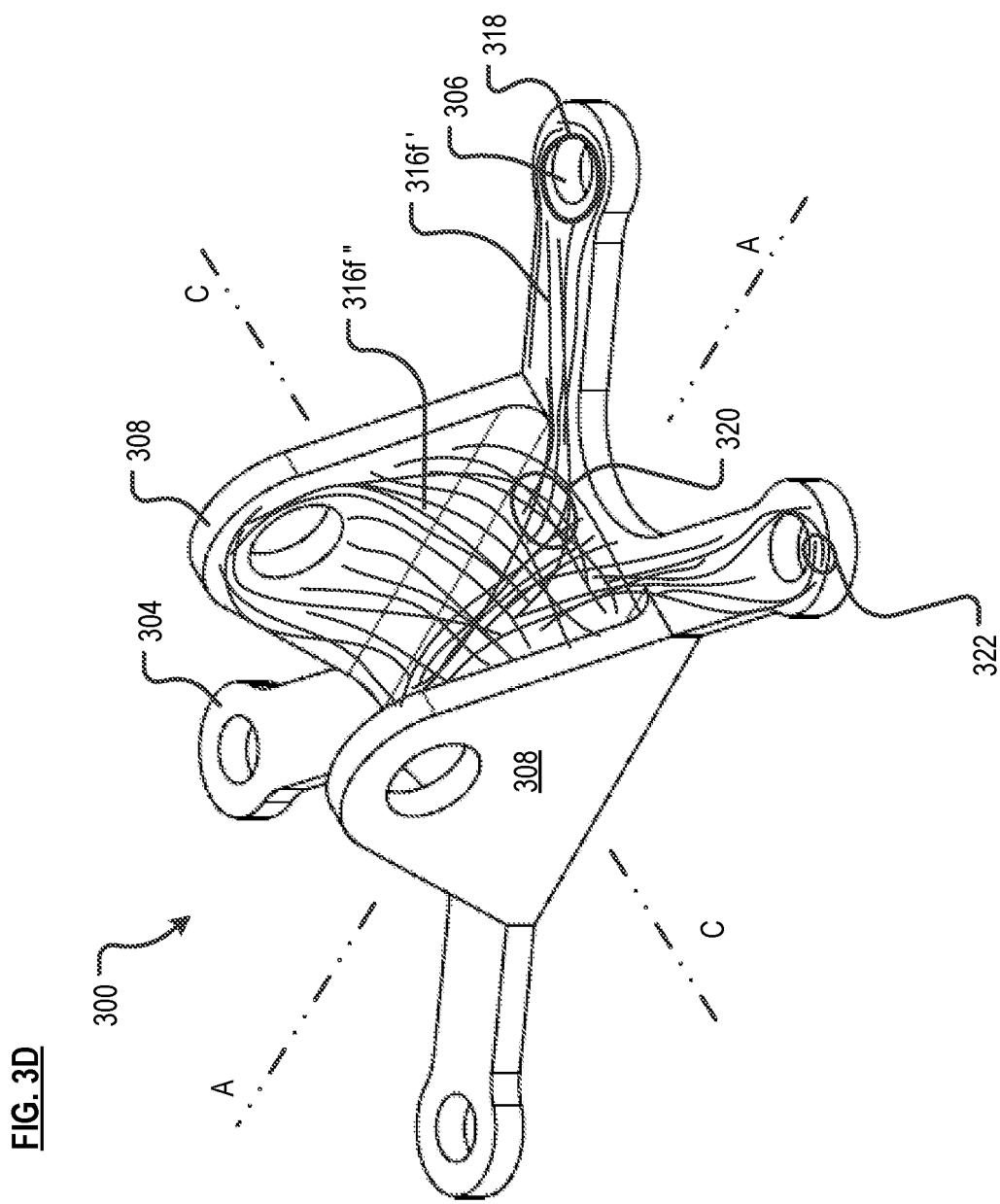
FIG. 3D depicts a notional illustration of the distribution of fibers within part 300 based on the first arrangement of fiber bundles depicted in FIG. 3C.

FIG. 3D depicts a representation of the orientation of the fibers (from preforms 316' and 316") in bracket 300. As implied above, the fibers from the preforms flow into mold cavity 300' in the order in which they are positioned in the plunger cavity, those on the bottom (i.e., on the surface of mold cavity 300') flowing first.

Thus, fibers 316f' from lower, axially-aligned preforms 316' will preferentially fill horizontal tab portions 304' (FIG. 3B) of the mold cavity first, which are generally aligned with axis A-A. Fibers 316f" from transversely oriented preforms 316" begin filling mold cavity 300' after all fibers 316f' from preforms 316' have flowed into the mold cavity. The intent is to have fibers 316f" filling vertical tabs 308. The transverse orientation of fibers 316f" is not to promote flow toward vertical tabs 308; rather, it is to facilitate an overlap with axially running fibers 316f'.

Preforms follow the path of least resistance, which typically means flowing along the long axis of the mold cavity and towards regions of lowest pressure. The latter parameter—pressure—can be altered through the use of strategically located vents, as previously disclosed. This technique can be used to selectively direct the flow of resin and fibers to a particular location.

Thus, in the present embodiment, vents (not depicted) are situated to vent pressure at the terminus of horizontal tab portions 304' and at the top of vertical tab portions 308' of the mold cavity (FIG. 3C). In some embodiments of the invention, after fibers 316f' from preforms 316' flow to horizontal tabs portions 304', the vents controlling the pressure at those locations are closed and the vents controlling the pressure at the tip of vertical tab portions 308' are opened. This creates a region of relatively lower pressure at the tips of the vertical tab portions of the mold cavity, and resin/fibers preferentially flow toward those locations.

As a consequence of vertical tabs 308, it is likely that gravity will result in resin/fiber flowing preferentially to horizontal tab portions 304' and then, as the level of resin rises, fibers/resin will eventually flow to vertical tab portions 308'. Although some mixing will occur, fibers 316f''' from bundles 316" will primarily end up in vertical tabs 308, aligned with the axis C-C (see FIG. 3D).

Mixing between fiber orientations occurs near the middle of bracket 300, such as at location 320. This facilitates strong connections between all features of bracket 300. And overlap between fibers flowing around holes 306 in different directions, such as at location 322, results in good hoop strength for those features.

Fiber bundles at other angles (i.e., not aligned with axes A-A or C-C) could also be included. In some embodiments, axially aligned preforms 316' are made from carbon fiber towpreg and transversely aligned preforms 316" are made from glass fiber towpreg, both incorporating the same resin. This results in vertical tabs 308 being more compliant than horizontal tabs 304. Moreover, fiber volume fraction could be varied across the stack to engineer different material properties for different portions of bracket 300.

In a further embodiment, part strength is increased in select areas using a preform that is placed in mold cavity 300' prior to flowing the preforms into the mold cavity. For example, if an amount of hoop strength is required that is greater than what is nominally expected from the methods disclosed herein (i.e., that which results from the overlap of flowing fibers coming from both sides of fastener holes 306), a helical, spiral, or circular fiber-bundle preform, such as preform 318, is placed around one or more of holes 306. The flowing fibers from the method described herein overlap and couple to preform 318 and connect it to the rest of the part during the molding process.

In accordance with the present method, to fabricate scoop 200 (FIGS. 2A-2L) or bracket 300 (FIGS. 3A-3D), the mold parts are combined (closed), except for the plunger, leaving the plunger cavity open. The final weight of the part is estimated from part volume and the density of the composite material. Maximum length(s) for the fibers are determined as a function of its intended location and orientation in the mold cavity. The maximum length for preforms is determined as a function of its orientation in the plunger cavity. Preforms are created by cutting towpreg in appropriate lengths, recognizing that the allowable length of a fiber, as calculated based on its orientation in the mold, might be longer than its actual length, as determined and permitted based on the size of the plunger cavity.

All fibers are weighed to check that the weight of the fiber/resin matches the expected final part weight. The total weight of the preforms can slightly exceed the expected part weight since some of the resin, and even fiber, will flow into the vents of the mold.

Preforms are then stacked in the plunger cavity in the requisite order and orientation. The plunger is then placed in the plunger cavity. The entire mold, including the plunger cavity, plunger, and mold cavity are heated. In some embodiments, cartridge heaters or the like, which are inserted through holes into the mold, are used to heat the plunger, the plunger cavity, and the mold cavity. In some other embodiments, the mold is situated on a heated platen, which is used to heat the mold. For large molds, an insulating blanket can be placed around the mold to reduce radiative and convective heat losses. In most embodiments in which plural groups (different types) of preforms are used, there is no need to differentially heat the different groups of preforms. Depending on the manner in which the preforms are stacked, after mixing in the plunger cavity of different fibers from different preforms is minimal. To the extent it may, in certain applications, be desirable to melt one type of preform before another type, this can be accomplished by operating the mold cavity at a higher temperature than the plunger/plunger cavity.

After heating, the plunger is pressed against the preforms, thereby compressing the fibers and resin and forcing them into the mold cavity. After an appropriate amount of time under heat and pressure in accordance with compression molding protocols, heating ceases. In some embodiments, the mold is actively cooled, such by passing air, water, steam, or oil through cooling channels. After cooling, the mold is disassembled, as necessary, to remove the composite part formed by this process.

It is to be understood that the disclosure describes a few embodiments and that many variations of the invention can easily be devised by those skilled in the art after reading this disclosure and that the scope of the present invention is to be determined by the following claims.

What is claimed:

1. A method for compression molding utilizing a plunger cavity that is fluidically coupled to a mold cavity, and a plunger received by the plunger cavity, the method comprising:
   advancing the plunger in the plunger cavity to force fibers and resin into the mold cavity; and
   actuating, in sequence, a first vent that is fluidically coupled to a first region of a mold cavity, and a second vent that is fluidically coupled to a second region of the mold cavity, wherein the sequenced actuation of the first and second vents causes, in sequence, a first group of the fibers to preferentially flow to the first region of the mold cavity, and a second group of the fibers to preferentially flow to the second region of the mold cavity.

2. The method of claim 1 wherein fibers and resin forced into the mold cavity are sourced from a first group of preforms and a second group of preforms that are placed in the plunger cavity, and wherein the method comprises ordering the first group of preforms and the second group of preforms in a stack within the plunger cavity.

3. The method of claim 2 wherein ordering comprises positioning the first group of preforms in the plunger cavity so that the first group of fibers, which are sourced from the first group of preforms are forced into the mold cavity before the second group of fibers, which are sourced from the second group of preforms.

4. The method of claim 2 wherein the method comprises:
   placing the first group of preforms in a first orientation in the plunger cavity; and
   placing the second group of preforms in a second orientation in the plunger cavity, wherein the first orientation is different than the second orientation.

5. The method of claim 1 wherein the first group of preforms and the second group of preforms differ from one another as to at least one characteristic.

6. The method of claim 5 wherein the at least one characteristic is selected from the group consisting of (i) a length of fibers, respectively, in the first and second groups of preforms, (ii), a composition of the fibers, respectively, in the first and second groups of preforms, and (iii), a fiber volume fraction, respectively, in the first and second groups of preforms.

7. The method of claim 2 comprising coordinating the ordering of preforms in the plunger cavity with the sequencing of vent actuation so that the first group of fibers, which are sourced from the first group of preforms, enter the mold cavity before the second group of fibers, which are sourced from the second group of preforms, thereby ensuring that upon actuation of the first vent, the first group of fibers flow to the first region of the mold cavity.

8. A method for compression molding utilizing a plunger cavity that is fluidically coupled to a mold cavity, and a plunger received by the plunger cavity, the method comprising:

stacking a first group of preforms and a second group of preforms in the plunger cavity in a first order, each preform in the first group and the second group comprising resin-coated fibers, and wherein the first group of preforms and the second group of preforms differ from one another as to at least one characteristic;

advancing the plunger in the plunger cavity to force fibers and resin from the first group of preforms and the second group of preforms into the mold cavity in accordance with the first order; and actuating, in sequence, a first vent that is fluidically coupled to a first region of a mold cavity, and a second vent that is fluidically coupled to a second region of the mold cavity, wherein the sequence of vent actuation is coordinated with the ordered movement of the fibers and resin into mold cavity so that fibers from the first group of preforms flow to the first region and fibers from the second group of preforms flow to the second region.

\* \* \* \* \*